US012591814B2

(12) United States Patent
Athavale et al.

(10) Patent No.: US 12,591,814 B2
(45) Date of Patent: Mar. 31, 2026

(54) SYSTEM AND METHOD FOR MACHINE LEARNING USING MULTIPLE MODELS

(71) Applicant: Crowley Government Services, Inc., Jacksonville, FL (US)

(72) Inventors: Neil Athavale, Jacksonville, FL (US); Bhaskar Mandapaka, Toronto (CA); Shashank Panchangam, Fulshear, TX (US); Ashwani Dev, Jacksonville, FL (US); Chris Wolfl, Saint Johns, FL (US); Smijith Kunhiraman, Jacksonville, FL (US)

(73) Assignee: CROWLEY GOVERNMENT SERVICES, INC., Jacksonville, FL (US)

( * ) Notice: Subject to any disclaimer, the term of this patent is extended or adjusted under 35 U.S.C. 154(b) by 0 days.

(21) Appl. No.: 19/099,408

(22) PCT Filed: Jul. 31, 2023

(86) PCT No.: PCT/US2023/029141
§ 371 (c)(1),
(2) Date: Jan. 28, 2025

(87) PCT Pub. No.: WO2024/026147
PCT Pub. Date: Feb. 1, 2024

(65) Prior Publication Data
US 2025/0259112 A1 Aug. 14, 2025

Related U.S. Application Data

(60) Provisional application No. 63/393,612, filed on Jul. 29, 2022.

(51) Int. Cl.
*G06N 20/10* (2019.01)

(52) U.S. Cl.
CPC .................................... *G06N 20/10* (2019.01)

(58) Field of Classification Search
CPC .............................. G06N 20/10; G06N 20/20
See application file for complete search history.

(56) References Cited

U.S. PATENT DOCUMENTS

| | | |
|---|---|---|
| 2018/0336486 A1 | 11/2018 | Chu et al. |
| 2019/0087733 A1 | 3/2019 | Dooley et al. |

(Continued)

FOREIGN PATENT DOCUMENTS

| | | | |
|---|---|---|---|
| CN | 111859922 A | * 10/2020 | ............. G06Q 40/03 |

OTHER PUBLICATIONS

International Search Report and Written Opinion from PCT/US2023/029141 mailed Oct. 27, 2023, 11 Pages.

(Continued)

*Primary Examiner* — Li Wu Chang
(74) *Attorney, Agent, or Firm* — Michele V. Frank; Venable LLP

(57) ABSTRACT

Systems, methods, and computer-readable storage media for combining machine learning models which respectfully use public and private data using a third machine learning model. Upon training a public data machine learning model and a private data machine learning model, the system trains a public and private data machine learning model using a combination of: (1) historical public data machine learning predictions output by the public data machine learning model, and (2) historical private data machine learning predictions output by the private data machine learning model. The system then executes the public and private data machine learning models, resulting in a public data machine learning prediction and a private data machine learning prediction, then executes the public and private data machine learning model using the public data machine (Continued)

learning prediction and the private data machine learning prediction as inputs, resulting in a final prediction.

17 Claims, 6 Drawing Sheets

(56) References Cited

U.S. PATENT DOCUMENTS

| 2019/0377897 | A1 | 12/2019 | Griffin et al. | |
| 2020/0364541 | A1 | 11/2020 | Cho et al. | |
| 2021/0133577 | A1 | 5/2021 | Srinivasan et al. | |
| 2021/0272011 | A1 | 9/2021 | Yonetani | |
| 2022/0171664 | A1* | 6/2022 | Guzik | H04L 67/1008 |
| 2023/0359928 | A1* | 11/2023 | Chen | G06N 20/20 |
| 2024/0027206 | A1* | 1/2024 | Sharma | G06Q 10/047 |

OTHER PUBLICATIONS

Maini et al., "Dataset Inference: Owership Resolution in Machine Learning"; Published as conference paper at ICLR 2021; arXiv:2104. 10706v1 [stat.ML] Apr. 21, 2021; retrieved on Sep. 23, 2023; retrieved from the Internet <URL: https://arxiv.org/pdf/2014.10706. pdf>.

* cited by examiner

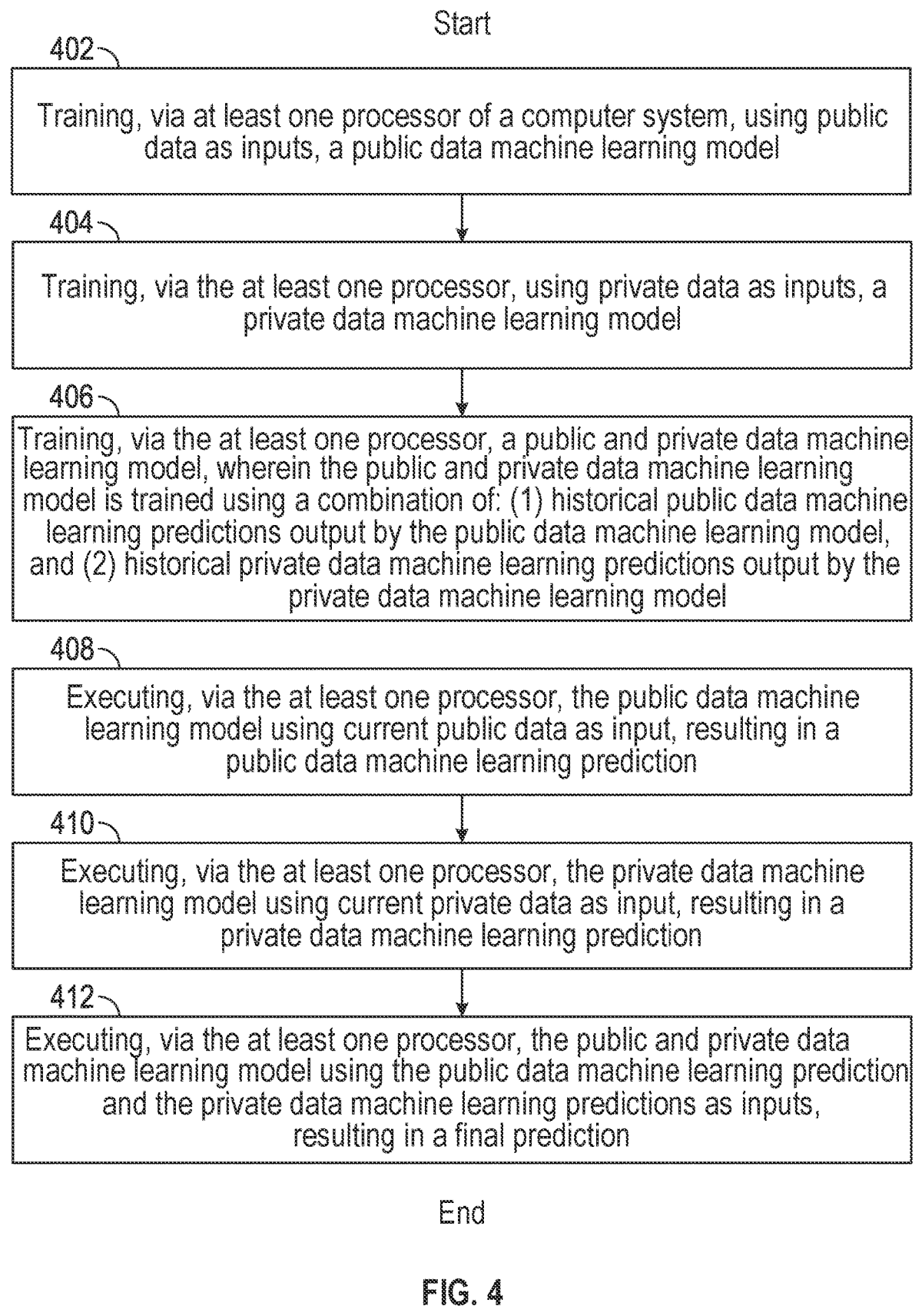

Start

402 —

Training, via at least one processor of a computer system, using public data as inputs, a public data machine learning model

404 —

Training, via the at least one processor, using private data as inputs, a private data machine learning model

406 —

Training, via the at least one processor, a public and private data machine learning model, wherein the public and private data machine learning model is trained using a combination of: (1) historical public data machine learning predictions output by the public data machine learning model, and (2) historical private data machine learning predictions output by the private data machine learning model

408 —

Executing, via the at least one processor, the public data machine learning model using current public data as input, resulting in a public data machine learning prediction

410 —

Executing, via the at least one processor, the private data machine learning model using current private data as input, resulting in a private data machine learning prediction

412 —

Executing, via the at least one processor, the public and private data machine learning model using the public data machine learning prediction and the private data machine learning predictions as inputs, resulting in a final prediction End

FIG. 4

SYSTEM AND METHOD FOR MACHINE LEARNING USING MULTIPLE MODELS

CROSS-REFERENCE TO RELATED APPLICATIONS

The instant application is a national stage application, filed under 35 U.S.C. § 371, of International Application No. PCT/US2023/029141, filed Jul. 31, 2023, which claims priority to U.S. Provisional Application No. 63/393,612, filed Jul. 29, 2022. The entire contents of each application is incorporated herein by reference.

BACKGROUND

1. Technical Field

The present disclosure relates to machine learning, and more specifically to combining public data machine learning model outputs with private data machine learning model outputs.

2. Introduction

Machine learning models are files used to recognize certain types of patterns. Once a model is trained, the model can be executed using new data, resulting in a prediction about the new data.

SUMMARY

Additional features and advantages of the disclosure will be set forth in the description that follows, and in part will be understood from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media which provide a technical solution to the technical problem described. A method for performing the concepts disclosed herein can include a method comprising training, via at least one processor of a computer system, using public data as inputs, a public data machine learning model, training, via the at least one processor, using private data as inputs, a private data machine learning model, training, via the at least one processor, a public and private data machine learning model, wherein the public and private data machine learning model is trained using a combination of: (1) historical public data machine learning predictions output by the public data machine learning model, and (2) historical private data machine learning predictions output by the private data machine learning model, executing, via the at least one processor, the public data machine learning model using current public data as input, resulting in a public data machine learning prediction, executing, via the at least one processor, the private data machine learning model using current private data as input, resulting in a private data machine learning prediction, and executing, via the at least one processor, the public and private data machine learning model using the public data machine learning prediction and the private data machine learning prediction as inputs, resulting in a final prediction.

A system configured to perform the concepts disclosed herein can include a system comprising at least one processor, and a non-transitory computer-readable storage medium having instructions stored which, when executed by the at least one processor, cause the at least one processor to perform operations comprising: training, using public data as inputs, a public data machine learning model; training, using private data as inputs, a private data machine learning model; training a public and private data machine learning model, wherein the public and private data machine learning model is trained using a combination of: (1) historical public data machine learning predictions output by the public data machine learning model, and (2) historical private data machine learning predictions output by the private data machine learning model; executing the public data machine learning model using current public data as input, resulting in a public data machine learning prediction; executing the private data machine learning model using current private data as input, resulting in a private data machine learning prediction; and executing the public and private data machine learning model using the public data machine learning prediction and the private data machine learning prediction as inputs, resulting in a final prediction.

A non-transitory computer-readable storage medium configured as disclosed herein can have instructions stored which, when executed by a computing device, cause the computing device to perform operations which include: training, using public data as inputs, a public data machine learning model; training, using private data as inputs, a private data machine learning model; training a public and private data machine learning model, wherein the public and private data machine learning model is trained using a combination of: (1) historical public data machine learning predictions output by the public data machine learning model, and (2) historical private data machine learning predictions output by the private data machine learning model; executing the public data machine learning model using current public data as input, resulting in a public data machine learning prediction: executing the private data machine learning model using current private data as input, resulting in a private data machine learning prediction; and executing the public and private data machine learning model using the public data machine learning prediction and the private data machine learning prediction as inputs, resulting in a final prediction.

BRIEF DESCRIPTION OF THE DRAWINGS

FIG. 4 illustrates an example method embodiment.

DETAILED DESCRIPTION

Figure 1:
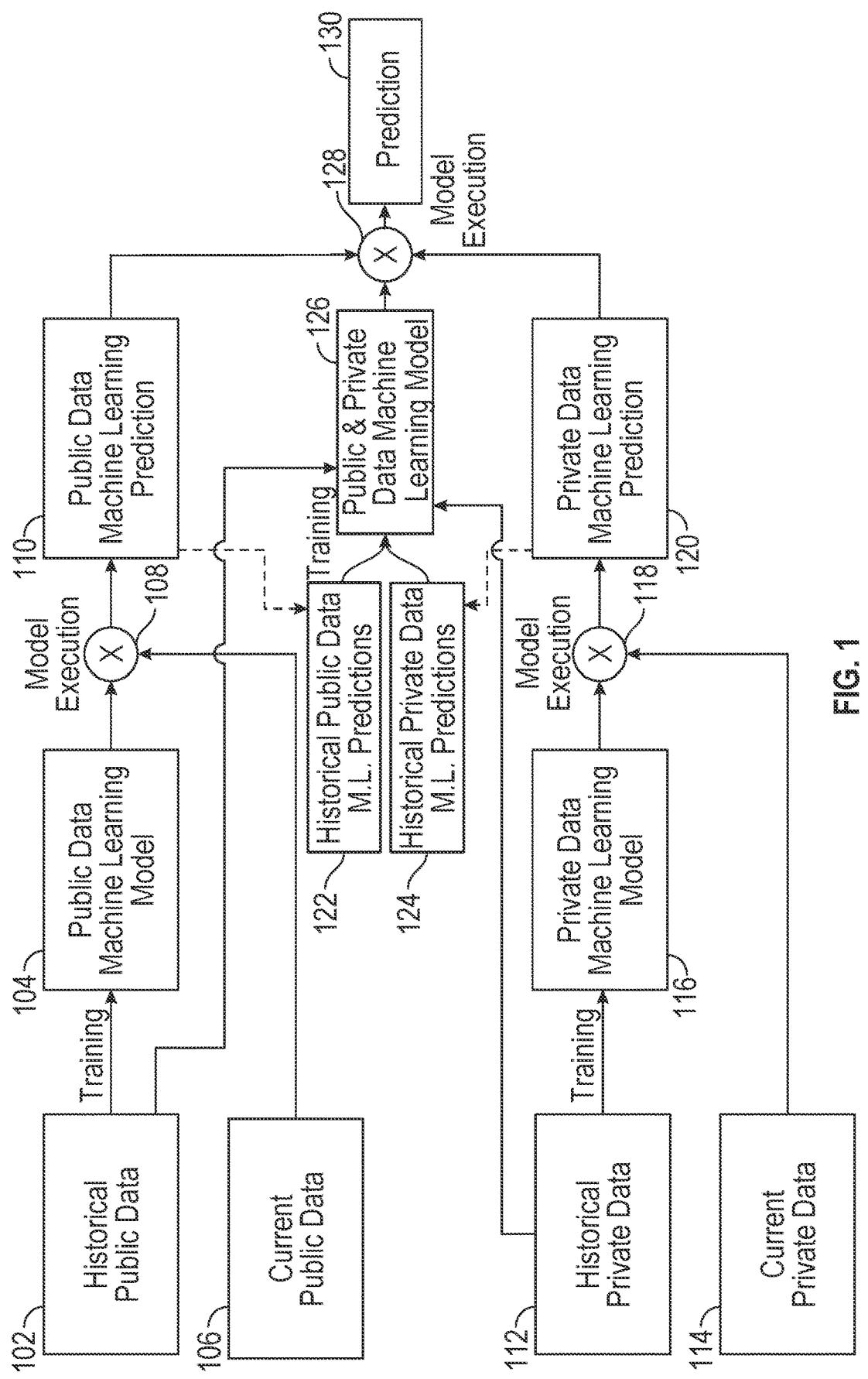
FIG. 1 illustrates a first example system embodiment.

Various embodiments of the disclosure are described in detail below. While specific implementations are described. this is done for illustration purposes only. Other components and configurations may be used without parting from the spirit and scope of the disclosure.

Machine learning models often rely on the aggregation of multiple different types of data. For example, training a machine learning model often includes constructing a neural network, where multiple different types of data can be analyzed (e.g., using a multi-layer regression analysis), with the result being a single machine learning model. To use that single machine learning model, the user will input new or current variables corresponding to the data used to train the model, with the output being a prediction based on the combined variables.

However, training the single machine learning model requires a great deal of processing time, with additional training being required each time the data associated with any given variable is sufficiently updated. For example, if the machine learning model were trained using variables "A" "B" and "C", if the data associated with variable "A" were updated it would cause the entirety of the machine learning model to be updated, despite variables "B" and "C" not changing. Training of the machine learning models can occur using any known machine learning training mechanisms known to those of skill in the art, such as k means clustering, random forest regressions, etc.

By contrast, systems configured as disclosed herein can train distinct machine learning models different data types, such as private and public data, resulting in public and private machine learning models. Another machine learning model can be trained using outputs from the private and public machine learning models. The trained machine learning models can be stored as algorithms, such as serialized python object structures, where the object stored in memory is converted to a byte stream which is then stored as a binary file on the disk. When the system executes the machine learning models, this binary file is loaded back (deserialized) into the system's memory. When executed, the system can combine/aggregate the results of the private, public, and private/public machine learning models together.

The aggregation of outputs from the multiple machine learning models can occur through any accepted mechanism known to those skilled in the art. For example, in some configurations, the aggregation can be an average of the outputs from the multiple machine learning models. In other configurations, a weight can be assigned to each model within the multiple machine learning models. The weight can, for example, be based on how accurate each model has been during previous iterations. During aggregation, the output of each model can be multiplied by the weight associated with that model, then the weighted results can be added together to form the aggregated result. In some configurations, the system can use a random forest algorithm (e.g., a regression or decision tree) to identify which of the multiple machine learning model outputs should be used.

Consider the following example. A company is seeking to make a prediction regarding manufacturing needs over the next three months. The system trains a first machine learning model using historical public data, such as (but not limited to) consumer price index information, fuel costs, debt loads of consumers, shipment equipment type, shipment weight, shipment volume, shipment winning bid price, and other shipment attributes, etc., compared to previously computed manufacturing outputs. The system can also use other publicly available market/economic data if that data improves model performance. The system also trains a second machine learning model using private data exclusive to that company, such as historical costs, overhead, distances between manufacturing locations and freight carriers. A third machine learning model is trained using the outputs of the first and second machine learning models, as well as any additional data (public or private) desired. Upon execution of the models, the first and second models can be executed in parallel or in series, then the third machine learning model can be executed using the outputs of the first and second models as inputs. The output of the third machine learning model can then provide the company the final prediction regarding manufacturing needs.

As another example, company is seeking to make efficient predictions regarding freight bidding using a combination of public data and private data. Exemplary public data could include data about loads where bids were previously awarded, such as the start location (e.g., an origin city/state/address), a destination location (e.g., destination city/state/address), load weight, distance to be travelled. CASS FREIGHT INDEX (a measure of monthly freight activity, widely used by analysts and economists as an indicator of North American economic trends) values at the time of the bid, consumer price index information at the time of the bid, fuel price data, and the historical winning bid price. Exemplary private data could include information about previous predictions made by the company, overhead costs, costs to the carrier, and ATR (Aggregate Tender Rate) Fees (fees that shipment bid winners have to pay along with the winning bid price to the government/shipper).

Just as with the prior manufacturing example, a system configured to make predictions regarding freight bidding as disclosed herein can train separate machine learning models for the public data and the private data, then combine the outputs of those distinct machine learning models for a final prediction. In some configurations, the aggregation of the distinct machine learning models can be made through summation, weights, or other mathematical combination. In other configurations, another machine learning model can be trained using the outputs of the public and private machine learning models (and/or any additional public and/or private data), and the output of this third machine learning model can be the final prediction of the system.

The various machine learning models can be stored in a common database or storage medium, or can be stored across multiple databases/mediums. In some configurations, the execution of the machine learning models can occur in series or in parallel. In yet other configurations, the execution of the machine learning models can occur partially in series and partially in parallel. For example, execution of the public and private machine learning models can be executed in parallel, and the outputs of those respective models can be used as inputs to the public/private machine learning model making the final prediction.

Retraining of the machine learning models can occur on a periodic basis (such as when a given amount of time has passed, or when a certain number of iterations has occurred) or when error rates associated with a given model meet a predetermined threshold. For example, consider if the predetermined threshold for a given machine learning model is at five percent within ten iterations. If the error rate for predictions made by that machine learning model over the next ten iterations exceeds five percent, the system may retrain that machine learning model. In yet other cases, the machine learning models may be retrained upon a predetermined threshold of new training data being received. In some configurations, the prediction outputs of the respective machine learning models can be compared to the realized values for item being predicted, and differences between the predictions and reality can be used to retrain the models. The predictions made by the models can be added to the database of historical data, such that the predictions (and their accuracy) can be used for future iterations. For example, a prediction from one of the models can be compared to the actual results, then that comparison can be used to retrain the model such that subsequent iterations provide improved results.

In some configurations, the system can output a coefficient value that can be utilized on baseline rates outside of the models and in a production environment. For example, baseline rates/values can be set, and a rate modifier (or modifiers) can be added to arbitrary regions as defined by users. Systems configured in this manner can predict those rate modifiers in the form of coefficients, where the coefficient represents how fast a given variable being analyzed will change over time.

In addition, there can be a preprocessing step before executing public data prediction models. In such configurations, the system can cluster location data into groups (i.e., clusters) of similarly behaving states, lanes (e.g., a source location, a destination, and optionally a route between source and destination locations), or other geographically-based clusters. Such clustering can be generated using a location clustering model on original data (public and/or private). The system can then use those clusters of geographically-based data to train cluster-specific prediction models. Such models can be formed using public and/or private data. Upon execution of those cluster prediction models, the resulting cluster model predictions can be used inputs for the final model being executed, such as the public and private data machine learning model and/or the modifier coefficient model.

For example, the clustering model can take public data, such as location data and statistical quartile historical GFM (Global Freight Management) price data as inputs. Exemplary clusters can be determined for origin locations (e.g., origin state or city, such as Texas or Dallas), state lanes (e.g., an origin state and a destination state, as Florida to Georgia), and city lanes (e.g., an origin city and a destination city, such as Memphis to Chicago).

With that description the disclosure turns to the specific examples illustrated in the figures.

FIG. 1 illustrates a first example system embodiment. In this example, the system has access to historical public data 102 which is used to train a public data machine learning model 104. The system also has access to historical private data 112 which is used to train a private data machine learning model 116. The system can also train a third machine learning model 126, a public and private machine learning model 126, using historical public data machine learning (M.L.) predictions 122 and historical private data M.L. predictions 124, as well as any additional historical public data 102 or historical private data 112 desired for a particular configuration.

During execution, the system can acquire current public data 106 and input that current public data 106 into the public data machine learning model 104 at execution 108, resulting in a public data machine learning prediction 110. The system can use current private data 114 and input that current private data 114 into the private data machine learning model 116 at execution 118, resulting in a private data machine learning prediction 120. The public machine learning prediction 110 and the private data machine learning prediction 120 can be used as inputs to the public and private machine learning model 126, such that upon execution of the public and private machine learning model 126 a final prediction 130 is generated. In some configurations, this final prediction 130 can be used in subsequent iterations of training the public and private machine learning model 126.

Figure 2:
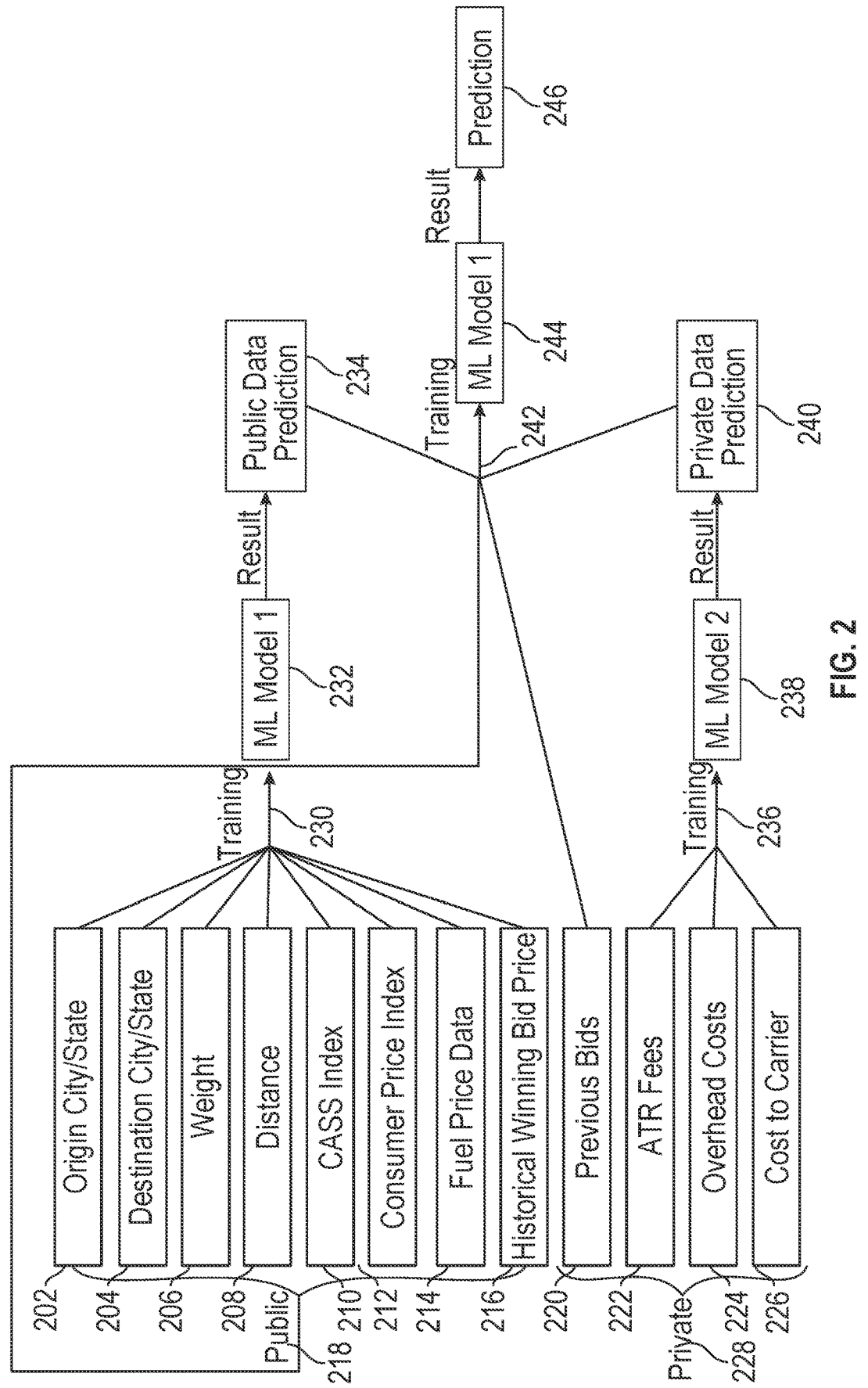
FIG. 2 illustrates a second example system embodiment.

FIG. 2 illustrates a second example system embodiment. This example is specific to freight transport, with public data 218 (such as, but not limited to: load origin city/state 202, load destination city/state 204, load weight 206, distance 208 the load would need to be moved, CASS FREIGHT INDEX 210 data, consumer price index data 212, fuel price data 214, and/or historical winning bids 216) being used to train 230 a first machine learning model, ML Model 1 232. Private data 228 (such as, but not limited to ATR Fees 222, overhead costs 224, and costs to carrier 226) can be used to train 236 a second machine learning model, ML Model 2 238. A third machine learning model, ML Model 3 244, can be trained 242 using a combination of public data 218, private data 228 (such as previous bids 220 made by a particular company), public data predictions 234 of ML Model 1 232, and/or private data predictions 240 of ML Model 2 238. After training ML model 1 232, ML model 2 238, and ML Model 3 244, the system executes by inputting current data into the machine learning models 232, 238, 244, where the data for each model corresponds to the data used to train the respective models. Thus current public data 218 will be input into ML Model 1 232, resulting in a public data prediction 234. Current private data 228 will be input into ML Model 2 238, resulting in a private data prediction 240. ML Model 3 244 will be executed using the public data prediction 234 and the private data prediction 240, along with any additional public data 218 or private data (such as previous bids 220), as inputs, with the result of the ML Model 3 244 execution being a final prediction 246.

Figure 3:
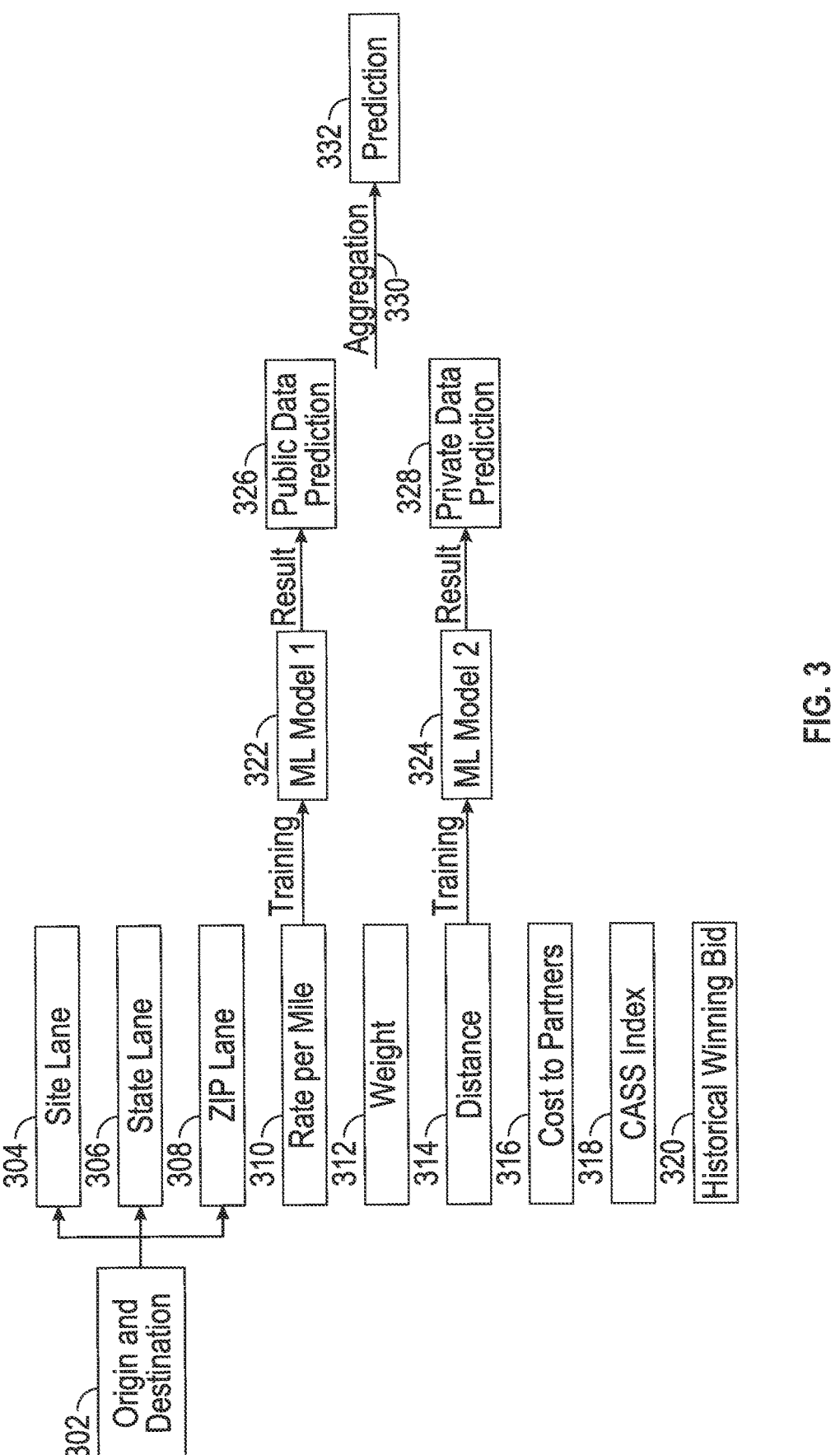
FIG. 3 illustrates a third example system embodiment.

FIG. 3 illustrates a third example system embodiment, with the data again being associated with freight transport. In this example, two different machine learning models (ML Model 1 322 and ML Model 2 324) using data selected from a common pool of data sets. Exemplary data set can include, as illustrated: origin and destination data 302, such as a site lane 304 (indicating the site origin/destination of a freight load), a state lane 306 (indicating the state origin/destination of a freight load), the zip lane 308 (indicating the zip code origin/destination of a freight load), the rate per mile 310 for a freight load, the weight 312 of the freight load, the distance 314 between origin and destination of a freight load, the cost to shipping partners 316 of a freight load, CASS FREIGHT INDEX 318 data, and/or historical winning bids 320.

In this example, while two distinct machine learning models (ML Model 1 322 and ML Model 2 324) are illustrated, the particular data used to train and execute those models is not defined. Instead, the two distinct models can be trained using preferred data for one's particular circumstances. Nevertheless, to distinguish between the respective outputs of the models (and for consistency throughout this disclosure), the output of ML Model 1 is illustrated as a Public Data Prediction 326 and the output of ML Model 2 is illustrated as a Private Data Prediction 328. During execution, the public data prediction 326 and the private data prediction 328 are aggregated together 330, with the result being the final prediction 332 of the system. Aggregation 330 can occur through any means disclosed herein, such as use of a third machine learning model trained using the public and private predictions 326, 328, adding or otherwise mathematically combining together the public and private predictions 326, 328 (including weighting or otherwise modifying the public and private predictions 326, 328 as desired).

FIG. 4 illustrates an example method embodiment. The method, as illustrated, can include training, via at least one processor of a computer system, using public data as inputs, a public data machine learning model (402) and training, via the at least one processor, using private data as inputs, a private data machine learning model (404). The system also trains, via the at least one processor, a public and private machine learning model, wherein the public and private machine learning model is trained using a combination of: (1) historical public data machine learning predictions output by the public data machine learning model, and (2) historical private data machine learning predictions output by the private data machine learning model (406). The system then executes, via the at least one processor, the public data machine learning model using current public data as input, resulting in a public data machine learning prediction (408) and executes, via the at least one processor, the private data machine learning model using current private data as input, resulting in a private data machine learning prediction (410). The system then executes, via the at least one processor, the public and private machine learning model using the public data machine learning prediction and the private data machine learning prediction as inputs, resulting in a final prediction (412).

In some configurations, the public data and the private data can be associated with freight transport costs. In such configurations, the public data can include: origin location data; destination location data; fuel price data; and consumer price index data. In addition, in such configurations, the private data can include: overhead costs; and carrier costs.

In some configurations, the training of the public data machine learning model, the training of the private data machine learning model, and the training of the public and private data machine learning model occurs periodically. Moreover, in such configurations the method can further include: adding, via the at least one processor, the public data machine learning prediction to the historical public data machine learning predictions, resulting in updated historical public data; and adding, via the at least one processor, the private data machine learning prediction to the historical private data machine learning predictions, resulting in updated historical private data, wherein subsequent training of the public and private data machine learning model is based on the updated historical public data and the updated historical private data.

In some configurations, the execution of the public data machine learning model and the execution of the private data machine learning model occur in parallel, whereas in other configurations the public data machine learning model and the private data machine learning model can be executed in series.

Figure 5:
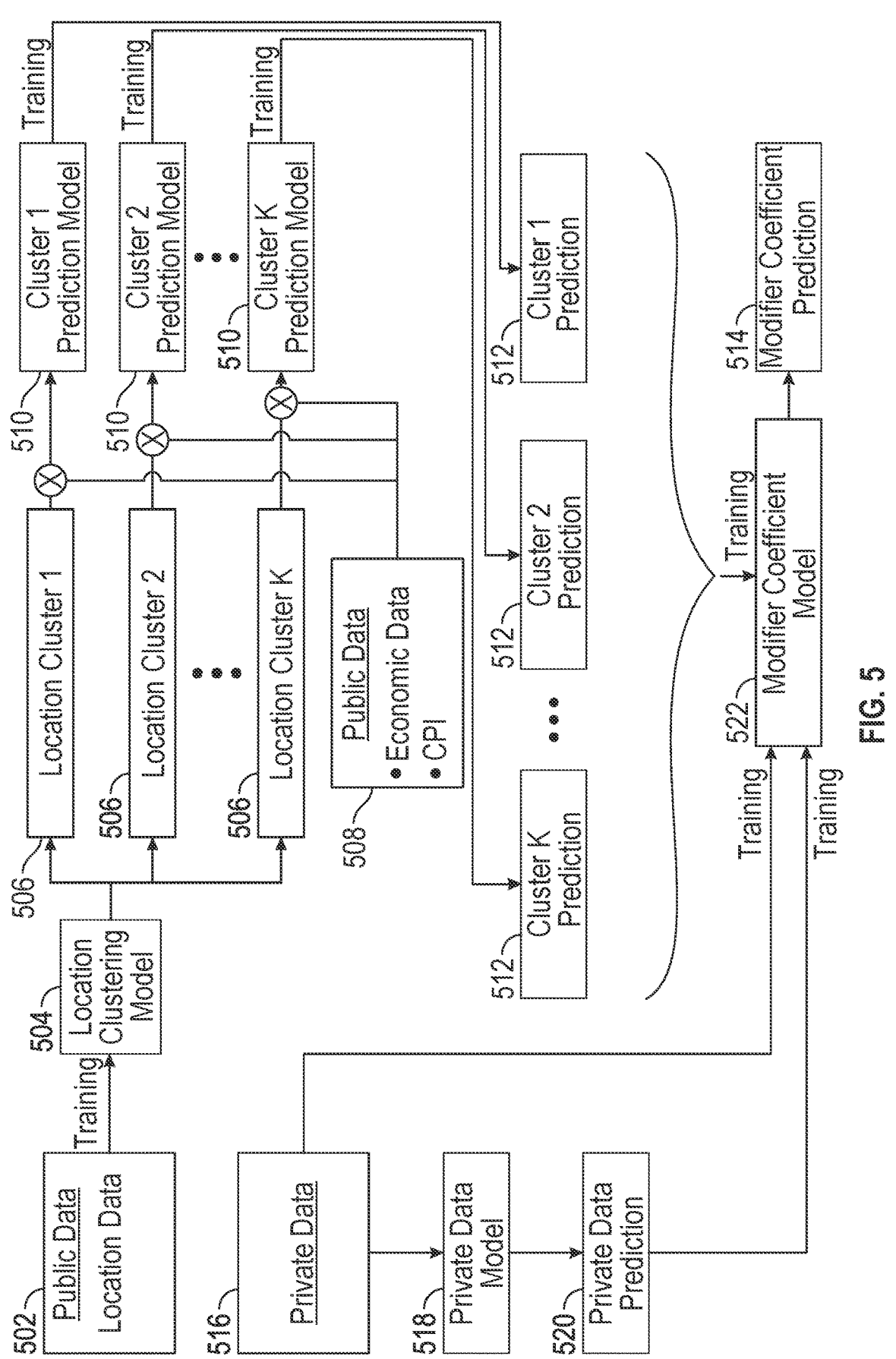
FIG. 5 illustrates a fourth example system embodiment.

FIG. 5 illustrates a fourth example system embodiment. In this example, the system again uses a mix of public data 502, 508 and private data 516 to make predictions, and specifically to make a modifier coefficient prediction 514 identifying how specific inputs to the system will likely change over time. As illustrated, the public data 502 can contain location data, which is used to train a location clustering model 504. The location clustering model 504 identifies geographic clusters of data within the input data. That is, when public data 502 containing location data is input into a trained location clustering model 504, the location clustering model 504 outputs location clusters 506. Exemplary, non-limiting examples of location clusters 506 can include clusters based on origin locations (e.g., origin state or city, such as New York or Buffalo), state lanes (e.g., an origin state and a destination state, as Utah to Nevada), and city lanes (e.g., an origin city and a destination city, such as Denver to Cheyanne)

The location clusters 506 can be used with additional public data 508, such as economic data, CPI (Consumer Price Index) data, housing data, etc., to generate cluster specific prediction models 510. Upon execution, the cluster specific prediction models 510 provide cluster specific predictions 512. These cluster specific predictions 512 can be used to train modifier coefficient model 522, along with private data 516 and the output of a private data model which, upon execution, produces a private data prediction 520. Execution of the modifier coefficient model 522 results in one or more coefficients 514, where the modifier coefficient prediction 514 represents how fast a given variable being analyzed will change over time.

Figure 6:
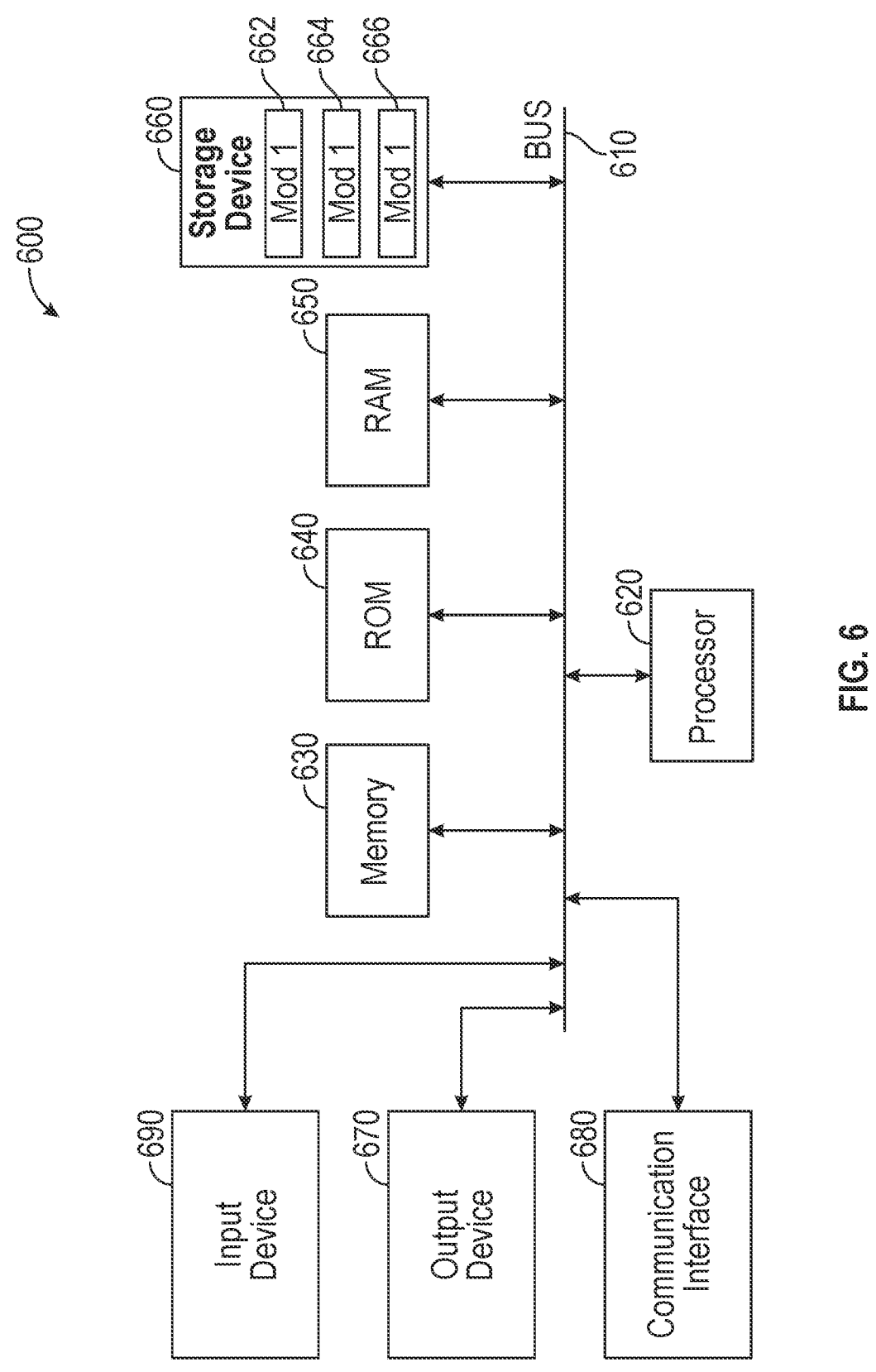
FIG. 6 illustrates an example computer system.

With reference to FIG. 6, an exemplary system includes a general-purpose computing device 600, including a processing unit (CPU or processor) 620 and a system bus 610 that couples various system components including the system memory 630 such as read-only memory (ROM) 640 and random-access memory (RAM) 650 to the processor 620. The system 600 can include a cache of high-speed memory connected directly with, in close proximity to, or integrated as part of the processor 620. The system 600 copies data from the memory 630 and/or the storage device 660 to the cache for quick access by the processor 620. In this way, the cache provides a performance boost that avoids processor 620 delays while waiting for data. These and other modules can control or be configured to control the processor 620 to perform various actions. Other system memory 630 may be available for use as well. The memory 630 can include multiple different types of memory with different performance characteristics. It can be appreciated that the disclosure may operate on a computing device 600 with more than one processor 620 or on a group or cluster of computing devices networked together to provide greater processing capability. The processor 620 can include any general-purpose processor and a hardware module or software module, such as module 1 662, module 2 664, and module 3 666 stored in storage device 660, configured to control the processor 620 as well as a special-purpose processor where software instructions are incorporated into the actual processor design. The processor 620 may essentially be a completely self-contained computing system, containing multiple cores or processors, a bus, memory controller, cache, etc. A multi-core processor may be symmetric or asymmetric.

The system bus 610 may be any of several types of bus structures including a memory bus or memory controller, a peripheral bus, and a local bus using any of a variety of bus architectures. A basic input/output (BIOS) stored in ROM 640 or the like, may provide the basic routine that helps to transfer information between elements within the computing device 600, such as during start-up. The computing device 600 further includes storage devices 660 such as a hard disk drive, a magnetic disk drive, an optical disk drive, tape drive or the like. The storage device 660 can include software modules 662, 664, 666 for controlling the processor 620. Other hardware or software modules are contemplated. The storage device 660 is connected to the system bus 610 by a drive interface. The drives and the associated computer-readable storage media provide nonvolatile storage of computer-readable instructions, data structures, program modules and other data for the computing device 600. In one aspect, a hardware module that performs a particular function includes the software component stored in a tangible computer-readable storage medium in connection with the necessary hardware components, such as the processor 620, bus 610, display 670, and so forth, to carry out the function. In another aspect, the system can use a processor and computer-readable storage medium to store instructions which, when executed by a processor (e.g., one or more processors), cause the processor to perform a method or other specific actions. The basic components and appropriate variations are contemplated depending on the type of device, such as whether the device 600 is a small, handheld computing device, a desktop computer, or a computer server.

Although the exemplary embodiment described herein employs the hard disk 660, other types of computer-readable media which can store data that are accessible by a computer, such as magnetic cassettes, flash memory cards, digital versatile disks, cartridges, random access memories (RAMs) 650, and read-only memory (ROM) 640, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 600, an input device 690 represents any number of input mechanisms, such as a microphone for speech, a touch-sensitive screen for gesture or graphical input, keyboard, mouse, motion input, speech and so forth. An output device 670 can also be one or more of a number of output mechanisms known to those of skill in the art. In some instances, multimodal systems enable a user to provide multiple types of input to communicate with the computing device 600. The communications interface 680 generally governs and manages the user input and system output. There is no restriction on operating on any particular hardware arrangement and therefore the basic features here may easily be substituted for improved hardware or firmware arrangements as they are developed.

The technology discussed herein refers to computer-based systems and actions taken by, and information sent to and from, computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Use of language such as "at least one of X, Y, and Z," "at least one of X, Y, or Z," "at least one or more of X, Y, and Z," "at least one or more of X, Y, or Z," "at least one or more of X, Y, and/or Z," or "at least one of X, Y, and/or Z," are intended to be inclusive of both a single item (e.g., just X, or just Y, or just Z) and multiple items (e.g., {X and Y}, {X and Z}, {Y and Z}, or {X, Y, and Z}). The phrase "at least one of" and similar phrases are not intended to convey a requirement that each possible item must be present, although each possible item may be present.

Further aspects of the present disclosure are provided by the subject matter of the following clauses.

A method comprising training, via at least one processor of a computer system, using public data as inputs, a public data machine learning model, training, via the at least one processor, using private data as inputs, a private data machine learning model, training, via the at least one processor, a public and private data machine learning model, wherein the public and private data machine learning model is trained using a combination of: (1) historical public data machine learning predictions output by the public data machine learning model, and (2) historical private data machine learning predictions output by the private data machine learning model, executing, via the at least one processor, the public data machine learning model using current public data as input, resulting in a public data machine learning prediction, executing, via the at least one processor, the private data machine learning model using current private data as input, resulting in a private data machine learning prediction, and executing, via the at least one processor, the public and private data machine learning model using the public data machine learning prediction and the private data machine learning prediction as inputs, resulting in a final prediction.

The method of any preceding clause, wherein the public data and the private data are associated with freight transport costs.

The method of any preceding clause, wherein the public data comprises: origin location data, destination location data, fuel price data, and consumer price index data.

The method of any preceding clause, wherein the private data comprises: overhead costs; and carrier costs.

The method of any preceding clause, wherein the training of the public data machine learning model, the training of the private data machine learning model, and the training of the public and private data machine learning model occurs periodically.

The method of any preceding clause, further comprising adding, via the at least one processor, the public data machine learning prediction to the historical public data machine learning predictions, resulting in updated historical public data; and adding, via the at least one processor, the private data machine learning prediction to the historical private data machine learning predictions, resulting in updated historical private data, wherein subsequent training of the public and private data machine learning model is based on the updated historical public data and the updated historical private data.

The method of any preceding clause, wherein the execution of the public data machine learning model and the execution of the private data machine learning model occur in parallel.

A system comprising at least one processor, and a non-transitory computer-readable storage medium having instructions stored which, when executed by the at least one processor, cause the at least one processor to perform operations comprising: training, using public data as inputs, a public data machine learning model; training, using private data as inputs, a private data machine learning model; training a public and private data machine learning model, wherein the public and private data machine learning model is trained using a combination of: (1) historical public data machine learning predictions output by the public data machine learning model, and (2) historical private data machine learning predictions output by the private data machine learning model; executing the public data machine learning model using current public data as input, resulting in a public data machine learning prediction; executing the private data machine learning model using current private data as input, resulting in a private data machine learning prediction; and executing the public and private data machine learning model using the public data machine learning prediction and the private data machine learning prediction as inputs, resulting in a final prediction.

The system of any preceding clause, wherein the public data and the private data are associated with freight transport costs.

The system of any preceding clause, wherein the public data comprises: origin location data; destination location data: fuel price data: and consumer price index data.

The system of any preceding clause, wherein the private data comprises: overhead costs; and carrier costs.

The system of any preceding clause, wherein the training of the public data machine learning model, the training of the private data machine learning model, and the training of the public and private data machine learning model occurs periodically.

The system of any preceding clause, wherein the non-transitory computer-readable storage medium having additional instructions stored which, when executed by the at least one processor, cause the at least one processor to perform operations comprising: adding the public data machine learning prediction to the historical public data machine learning predictions, resulting in updated historical public data; and adding the private data machine learning prediction to the historical private data machine learning predictions, resulting in updated historical private data, wherein subsequent training of the public and private data machine learning model is based on the updated historical public data and the updated historical private data.

The system of any preceding clause, wherein the execution of the public data machine learning model and the execution of the private data machine learning model occur in parallel.

A non-transitory computer-readable storage medium configured as disclosed herein can have instructions stored which, when executed by a computing device, cause the computing device to perform operations which include: training, using public data as inputs, a public data machine learning model; training, using private data as inputs, a private data machine learning model; training a public and private data machine learning model, wherein the public and private data machine learning model is trained using a combination of: (1) historical public data machine learning predictions output by the public data machine learning model, and (2) historical private data machine learning predictions output by the private data machine learning model; executing the public data machine learning model using current public data as input, resulting in a public data machine learning prediction; executing the private data machine learning model using current private data as input, resulting in a private data machine learning prediction: and executing the public and private data machine learning model using the public data machine learning prediction and the private data machine learning prediction as inputs, resulting in a final prediction.

The non-transitory computer-readable storage medium of any preceding clause, wherein the public data and the private data are associated with freight transport costs.

The non-transitory computer-readable storage medium of any preceding clause, wherein the public data comprises: origin location data; destination location data; fuel price data; and consumer price index data.

The non-transitory computer-readable storage medium of any preceding clause, wherein the private data comprises: overhead costs; and carrier costs.

The non-transitory computer-readable storage medium of any preceding clause, wherein the training of the public data machine learning model, the training of the private data machine learning model, and the training of the public and private data machine learning model occurs periodically.

The non-transitory computer-readable storage medium of any preceding clause, having additional instructions stored which, when executed by the at least one processor, cause the at least one processor to perform operations comprising: adding the public data machine learning prediction to the historical public data machine learning predictions, resulting in updated historical public data; and adding the private data machine learning prediction to the historical private data machine learning predictions, resulting in updated historical private data, wherein subsequent training of the public and private data machine learning model is based on the updated historical public data and the updated historical private data.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure. For example, unless otherwise explicitly indicated, the steps of a process or method may be performed in an order other than the example embodiments discussed above. Likewise, unless otherwise indicated, various components may be omitted, substituted, or arranged in a configuration other than the example embodiments discussed above.

We claim:

1. A method comprising:

training, via at least one processor of a computer system, using public data as inputs, a public data machine learning model;

training, via the at least one processor, using private data as inputs, a private data machine learning model;

training, via the at least one processor, a public and private data machine learning model, wherein the public and private data machine learning model is trained using a combination of: (1) historical public data machine learning predictions output by the public data machine learning model, and (2) historical private data machine learning predictions output by the private data machine learning model;

executing, via the at least one processor, the public data machine learning model using preprocessed clustered data as input, the preprocessed clustered data obtained by clustering current public data, resulting in a public data machine learning prediction;

executing, via the at least one processor, the private data machine learning model using current private data as input, resulting in a private data machine learning prediction;

adding, via the at least one processor, the public data machine learning prediction to the historical public data machine learning predictions, resulting in updated historical public data;

adding, via the at least one processor, the private data machine learning prediction to the historical private data machine learning predictions, resulting in updated historical private data, wherein subsequent training of the public and private data machine learning model is based on the updated historical public data and the updated historical private data; and executing, via the at least one processor, the public and private data machine learning model using the public data machine learning prediction and the private data machine learning prediction as inputs, resulting in a final prediction.

2. The method of claim 1, wherein the public data and the private data are associated with freight transport costs.

3. The method of claim 2, wherein the public data comprises:

origin location data;

destination location data;

fuel price data; and consumer price index data.

4. The method of claim 2, wherein the private data comprises:

overhead costs; and carrier costs.

5. The method of claim 1, wherein the training of the public data machine learning model, the training of the private data machine learning model, and the training of the public and private data machine learning model occurs periodically.

6. The method of claim 1, wherein the execution of the public data machine learning model and the execution of the private data machine learning model occur in parallel.

7. A system comprising:

at least one processor; and a non-transitory computer-readable storage medium having instructions stored which, when executed by the at least one processor, cause the at least one processor to perform operations comprising:

training, using public data as inputs, a public data machine learning model;

training, using private data as inputs, a private data machine learning model;

training a public and private data machine learning model, wherein the public and private data machine learning model is trained using a combination of: (1) historical public data machine learning predictions output by the public data machine learning model, and (2) historical private data machine learning predictions output by the private data machine learning model;

executing the public data machine learning model using preprocessed clustered data as input, the preprocessed clustered data obtained by clustering current public data, resulting in a public data machine learning prediction;

executing the private data machine learning model using current private data as input, resulting in a private data machine learning prediction;

adding public data machine learning prediction to the historical public data machine learning predictions, resulting in updated historical public data;

adding the private data machine learning prediction to the historical private data machine learning predictions, resulting in updated historical private data, wherein subsequent training of the public and private data machine learning model is based on the updated historical public data and the updated historical private data; and executing the public and private data machine learning model using the public data machine learning prediction and the private data machine learning prediction as inputs, resulting in a final prediction.

8. The system of claim 7, wherein the public data and the private data are associated with freight transport costs.

9. The system of claim 8, wherein the public data comprises:

origin location data;

destination location data;

fuel price data; and consumer price index data.

10. The system of claim 8, wherein the private data comprises:

overhead costs; and carrier costs.

11. The system of claim 7, wherein the training of the public data machine learning model, the training of the private data machine learning model, and the training of the public and private data machine learning model occurs periodically.

12. The system of claim 7, wherein the execution of the public data machine learning model and the execution of the private data machine learning model occur in parallel.

13. A non-transitory computer-readable storage medium having instructions stored which, when executed by at least one processor, cause the at least one processor to perform operations comprising:

training, using public data as inputs, a public data machine learning model;

training, using private data as inputs, a private data machine learning model;

training a public and private data machine learning model, wherein the public and private data machine learning model is trained using a combination of: (1) historical public data machine learning predictions output by the public data machine learning model, and (2) historical private data machine learning predictions output by the private data machine learning model;

executing the public data machine learning model using preprocessed clustered data as input, the preprocessed clustered data obtained by clustering current public data, resulting in a public data machine learning prediction;

executing the private data machine learning model using current private data as input, resulting in a private data machine learning prediction;

adding public data machine learning prediction to the historical public data machine learning predictions, resulting in updated historical public data;

adding the private data machine learning prediction to the historical private data machine learning predictions, resulting in updated historical private data, subsequent training of the public and private data machine learning model is based on the updated historical public data and the updated historical private data; and executing the public and private data machine learning model using the public data machine learning prediction and the private data machine learning prediction as inputs, resulting in a final prediction.

14. The non-transitory computer-readable storage medium of claim 13, wherein the public data and the private data are associated with freight transport costs.

15. The non-transitory computer-readable storage medium of claim 14, wherein the public data comprises:

origin location data;

destination location data;

fuel price data; and consumer price index data.

16. The non-transitory computer-readable storage medium of claim 14, wherein the private data comprises:

overhead costs; and carrier costs.

17. The non-transitory computer-readable storage medium of claim 13, wherein the training of the public data machine learning model, the training of the private data machine learning model, and the training of the public and private data machine learning model occurs periodically.

* * * * *